March 8, 1938. W. L. DAVIS 2,110,204
CONVEYER
Filed Oct. 29, 1934 2 Sheets-Sheet 1
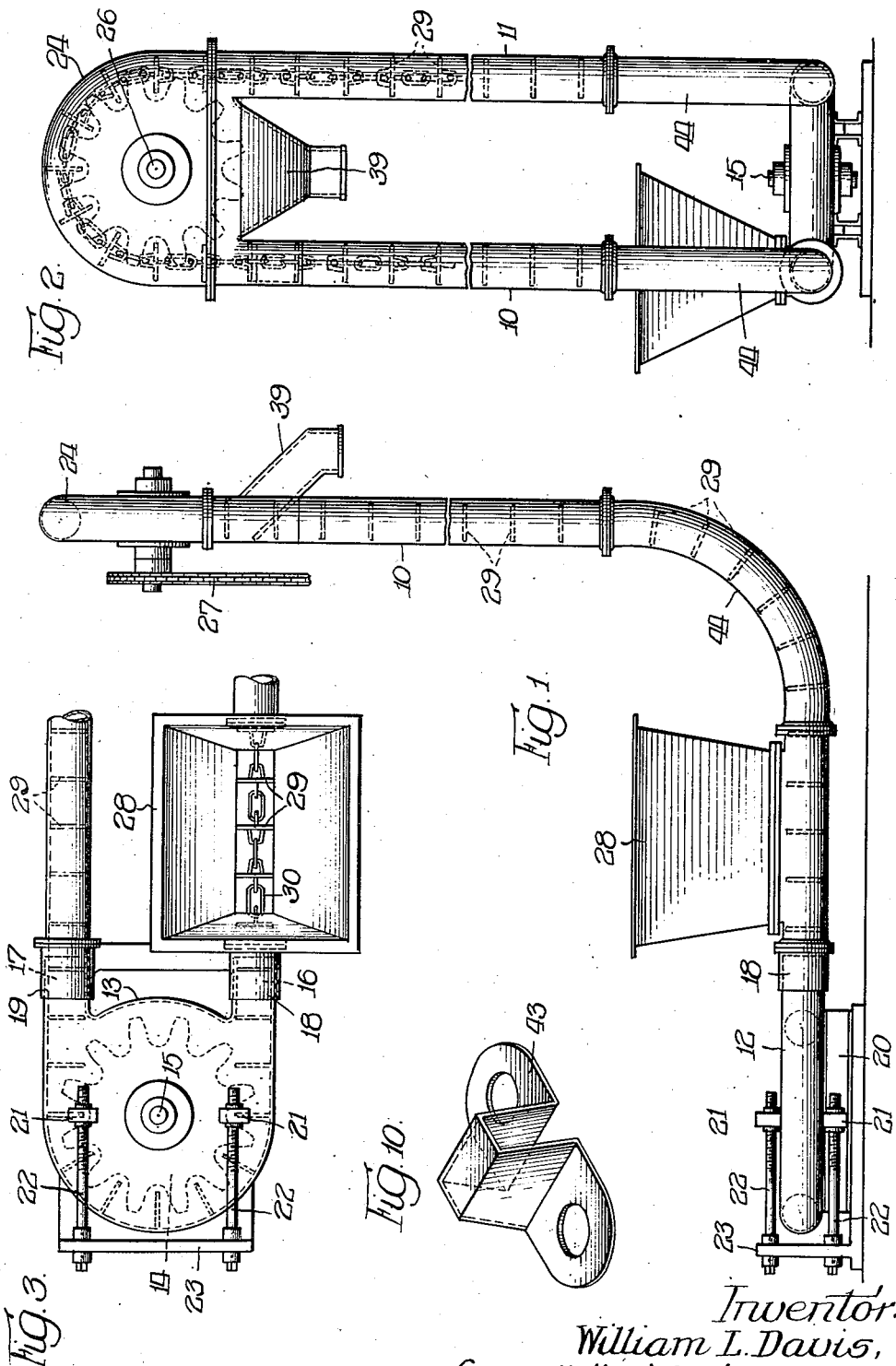
Inventor:
William L. Davis,
By Cromwell, Treust. Warden
Attys

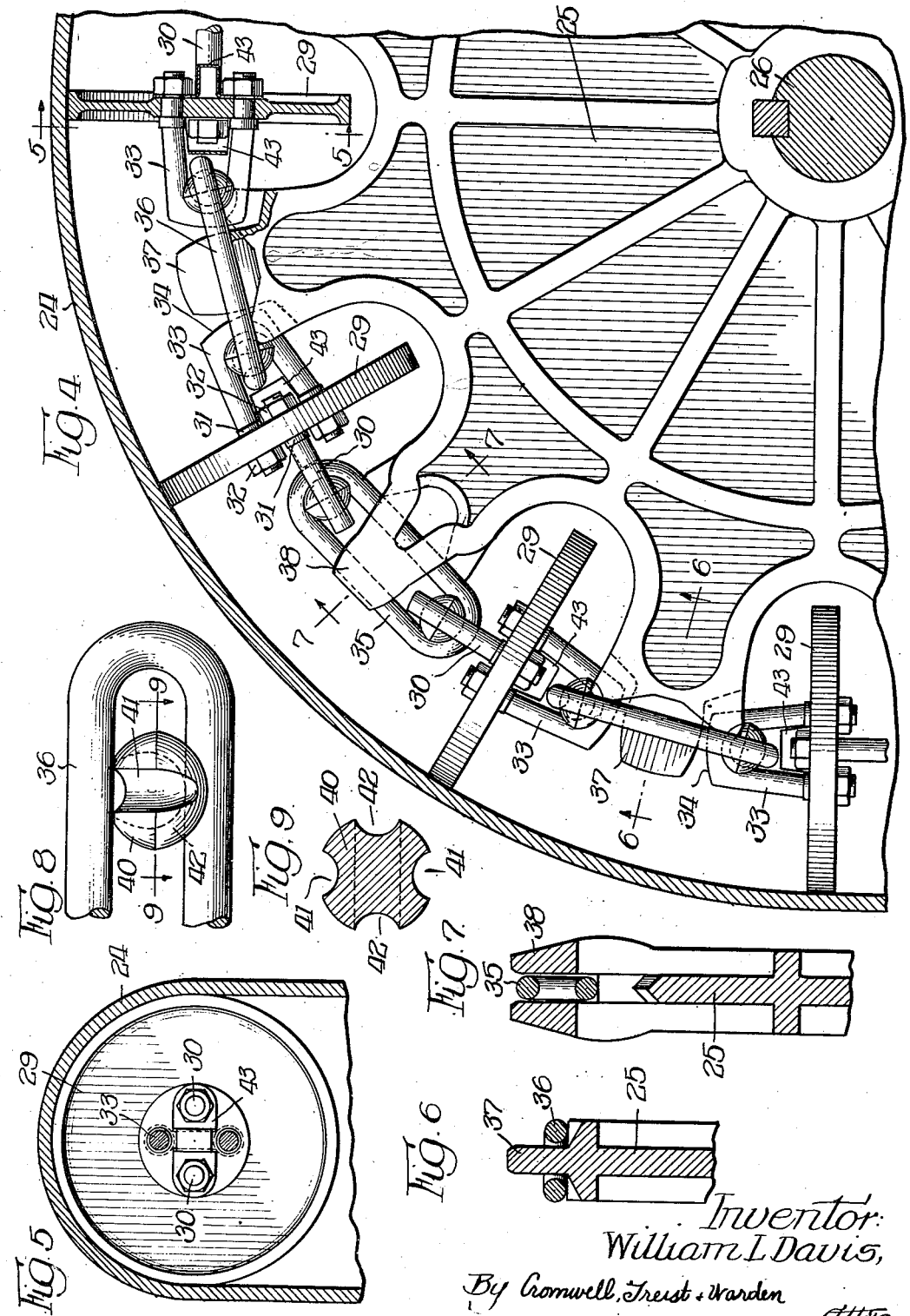

Patented Mar. 8, 1938

2,110,204

UNITED STATES PATENT OFFICE 2,110,204

CONVEYER

William L. Davis, Decatur, Ill., assignor to A. E. Staley Manufacturing Company, Decatur, Ill., a corporation of Delaware Application October 29, 1934, Serial No. 750,419

8 Claims. (Cl. 198—168)

The present invention relates to conveying mechanism, and has particular reference to an improved conveyer structure of the type adapted to transfer finely divided materials such as starch and the like.

A conveyer which has met with considerable success in transferring grain is illustrated in Patent No. 1,697,963, issued January 8, 1929. This type of conveyer acts upon the principle of mass movement and includes a closed conduit through which is drawn a conveyer chain having attached to it open flights which produce the mass movement of the material transferred. An objection to the Redler type of conveyer described in the patent referred to is that it tends to create a packing or molding of the materials conveyed, particularly where the material is transferred vertically. Furthermore, the action of the mechanism is not sufficiently positive to produce good results in many cases, including the necessity for leaving the conveyer filled with substantial quantities of the commodity conveyed.

A principal object of the present invention is the provision of an improved conveying mechanism by which materials such as starch and the like may be transferred without packing.

An additional object is to provide a conveyer mechanism which is economical to manufacture and simple in operation.

A further object is the provision of a conveyer having a series of solid conveyer disks traveling through the conveyer pipe or conduit and rotating relative thereto.

Still another object is the provision of an improved conveyer chain.

These and other objects will be evident from a consideration of the following description of a preferred embodiment of the invention and by reference to the accompanying drawings, in which Fig. 1 is a side view of a conveyer constructed in accordance with the invention;

Fig. 2 is an end view of the device shown in Fig. 1;

Fig. 3 is a fragmentary top view of the conveyer shown in Fig. 1;

Fig. 4 is an enlarged detailed view of the drive sprocket and conveyer chain;

Fig. 5 is a sectional view taken along line 5—5 of Fig. 4 and showing a conveyer disk;

Fig. 6 is a fragmentary sectional view taken along line 6—6 of Fig. 4 and shows one section of the sprocket drive;

Fig. 7 is a sectional view taken along line 7—7 of Fig. 4 and shows another section of the sprocket drive;

Fig. 8 is a detailed view of a conveyer chain link and bearing member therefor in the process of being assembled;

Fig. 9 is a sectional view of the bearing member shown in Fig. 8 taken along line 9—9 thereof; and Fig. 10 is a detailed view of the conveyer disk lug.

In the conveyer device shown in the drawings, which is particularly effective in the transferring of finely divided materials which tend to pack easily, the mass of material as transferred by the device is broken up into adjacent independent sections. The invention will be described with reference to the conveyance of dry starch.

The conveyer conduit or pipe includes a forward leg portion 10 and a backward or return leg portion 11. The conduit is formed of standard steel pipe of the proper diameter connected together into a continuous system extending from the supply of starch to the position to which it is desired to transfer the starch. The conduit system shown in the drawings is designed to convey starch from a lower position to a higher position.

The ends of legs 10 and 11 adjacent the lower or feed end of the conduit system are joined together by means of a telescopically arranged end section 12. This end section is of a thickness similar to that of the legs 10 and 11 and of similar curvature adjacent its outer portion, as will be seen from Fig. 1. An enlargement 13 on the end section carries a head pulley or sprocket 14, the shaft 15 of which is driven by a motor or other suitable means. The leg portions 16 and 17 of the end member 12 are telescopically arranged within enlarged heads 18 and 19 positioned respectively on the terminal ends of legs 10 and 11.

End member 12 rides upon the base member 20 and carries upper and lower lugs 21. Through the lugs 21 are threaded bolts 22, the latter being rotatably secured to a fixed standard 23. Rotation of bolts 22 causes the end member to move backwardly or forwardly with respect to the legs 10 and 11, thereby changing the effective length of the conduit system.

At their forward or discharge ends the legs 10 and 11 are joined together by a second end member 24 of a size and shape similar to the size and shape of the end member 12. A tail pulley or sprocket 25 is housed within the end member 24 and is adapted to reverse the direction of a conveyer chain, transferring it from an upward movement through leg 10 to downward movement through leg 11, as will appear more particularly hereinafter. The sprocket 25 may be driven by any suitable means, as by a chain 27 acting through shaft 26, as shown in Fig. 1.

At its lower portion, end member 24 is provided with a discharge hopper 39 which is adapted to receive starch falling from the conveyer chain as the latter passes through the end member 24.

Communicating with a horizontal section of the forward leg 10 of the conduit system is a feed or inlet hopper 28 into which starch to be conveyed is dumped.

The conveying mechanism is formed of a series of solid flights or disks 29 connected together by a continuous conveyer chain extending throughout the conduit system and driven by one or preferably both of the sprocket wheels 14 and 25. The disks preferably are formed of bronze and are of a shape and size similar to the shape and size of the interior of the conduit system. That is, the disks are round and have a diameter which permits a fairly close fit within the conduit system and at the same time allows for free movement of the disks therethrough.

Each disk is provided with a U-bolt 30 extending in a plane at right angles to the planes of the sprocket wheels, the legs of the bolts passing through corresponding openings in the disks. Enlarged portions 31 limit the projection of the U-bolts through the disks and nuts 32 are threaded on the protruding legs of the U-bolts on the opposite side of the disks to form a rigid mounting which prevents relative movement between the U-bolts and the disks. On the sides of the disks opposite the U-bolts 30 are secured similar U-bolts 33, the latter being positioned in planes parallel to the planes of the sprocket wheels and at right angles to the planes of the U-bolts 30. The U-bolts 33 have enlarged portions 31 limiting the movement of the legs through the disks and nuts 32 for rigidly securing the bolts to the disks in the manner described with respect to U-bolts 30. U-bolts 30 are centrally mounted on the disks in one plane and the U-bolts 33 are centrally mounted on the disks in a plane at right angles to U-bolts 30 in the ordinary manner of a chain, the central portion of each disk forming the link between the two U-bolts secured thereto.

The terminal or loop ends of the U-bolts 30 and 33 preferably are provided with a somewhat flattened outer surface 34, as shown in Fig. 4, the purpose of which is to form a drive seat for engagement with the prongs of the sprocket members.

The disks are positioned in series relation and the U-bolts on the adjacent faces of each pair of disks are in substantially the same plane. U-bolts 30 are connected together by link members 35 and U-bolts 33 are connected together by link members 36 in the ordinary manner of a chain.

Sprocket wheels 14 and 25 are provided with outwardly extending tooth members 37 which protrude through the link members 36 and drive the conveyer chain by engagement with the surfaces 34 of the U-bolts. Between adjacent members 37 the sprocket wheels are provided with yoke-like projections 38 which receive link members 35, as shown in Fig. 7, and drive the conveyer chain by engagement with the terminal ends of U-bolts 30.

Link members 35 and 36 are interlocked with the U-bolts and are spaced therefrom by bearing members 40. These bearing members preferably are sphere-like bodies of bronze and are provided with segmental grooves 41 on one side thereof and similar grooves 42 on the other side thereof extending in a plane at right angles to the grooves 41. Grooves 41 receive the terminal portion of the U-bolts, and grooves 42 receive the terminal portions of the link members. The U-bolts and link members are preferably constructed of steel and the bronze bearing members 40 provide highly desirable bearing surfaces and universal joints for the conveyer chain. It will be observed that the U-bolts and the link members rotate in contact with the bronze bearing member, so that there is no wear of steel upon steel or bronze upon bronze.

In the embodiment shown in the drawings, the bearing member is of spheroid shape. That is, the bearing member has a longer axis and a shorter axis, the groove 42 being in the side having the longer axis and the groove 41 being in the side having the shorter axis. The bearing member is of such size that in assembling the conveyer chain the intermediate portions of the link members may be fitted into groove 42, as shown in Fig. 8, and the bearing member then may be moved toward the terminal end of the link from and rotated into such position that the groove 42 will receive the terminal end of the link member. To complete assembly of the conveyer chain, the U-bolts then are passed through the link members and fitted into the grooves 41 prior to securement to the conveyer disks. Where the body thickness of the bearing member is too great to allow this type of assembly with the link members, the latter may be sprung to receive the bearing member and then closed.

In order to prevent retraction of the bearing member from its proper position, the disks 29 are provided with outwardly extending lugs 43, as shown in Fig. 4, which extend to a position adjacent the terminal ends of the link members. These link members may be fitted to the disks by being locked beneath the nuts 32, or may be cast integrally with the disks. The lugs 43 maintain the terminal ends of the link members in grooves 41, and so long as this position is maintained the bearing member cannot be retracted from its proper position, the combined width of the bearing member and the portion of the link which extends out of the channel 41 being greater than the distance between the legs of the link members and the U-bolts.

It will be seen that the link members and U-bolts form a continuous conveyer chain extending throughout the conveyer system and carrying the rigidly mounted solid disks through the conveyer pipe and between the inlet and discharge openings. The rigid mounting of the U-bolts in the disks and the driving of the conveyer chain under tension holds the disks in substantially transverse relation with respect to the conveyer pipe.

In operating the device starch is dumped into the feed hopper or inlet conduit 28 and falls into a position between adjacent conveyer disks. As the conveyer chain is moved along, the disks transfer the material therebetween as a plurality of separate and independent masses. The disks carrying the starch pass from the inlet opening upwardly through the leg 10 and over the sprocket wheel 25 which communicates with the discharge hopper 39. As the disks approach a vertical position on the sprocket wheel, the support for the starch is removed and the latter falls into the discharge opening. The dumping operation may be facilitated by a shaker arrangement, as by driving the sprocket wheel 25 with a shaking motion. The dumping arrangement also may be on a horizontal section of the pipe, and in such cases the shaking of the conveyer chain materially assists in dislodging the starch. Other shaking arrangements may be employed if desired.

The pulleys or sprockets 14 and 25 have an even number of teeth and, as described heretofore, adjacent teeth are designed to carry chain links turned at 90° to each other. The conveyer chain is designed to present an odd number of links between adjacent disks, and on the backward or return leg 11 of the conveyer the chain structure is given a quarter turn or twist, thereby imparting to the disk members a 90 degree rotation with respect to the conveyer pipe. In this manner the disks continually change their frictional surface with respect to the conveyer pipes, the limiting of the change being four different positions. In order to facilitate proper alignment of the conveyer chain after assembly it is preferred to cast or stamp the disks with an arrow or suitable indicia.

In changing from horizontal to vertical position, the legs 10 and 11 are provided with curved portions 44 which have a radius of approximately 10 times the diameter of the conveyer pipe and it is preferred to construct the curved portions 44 with an even larger radius of 15 times the diameter of the disk members. Thus, in a conveyer of 10 inch dimension the curve would have a radius of the order of 100 inches or more.

The number of disks employed will depend upon such factors as the material conveyed and the size of the conveyer pipe. Ordinarily, it is satisfactory to space the disks apart a distance of approximately 9 or 10 inches.

As described hereinbefore, the length of the conduit system can be changed to some extent by regulation of the position of end member 12. A particular advantage of this structure is that it permits the length of the conduit system to be adjusted in accordance with the length of the conveyor chain.

Many variations of the structure described herein for purposes of illustration and explanation may be made without departing from the scope of the invention and all such changes and modifications are intended to be included in the appended claims.

I claim:

1. In a conveying mechanism of the type described, a round conveyer pipe forming a forward leg provided with an inlet opening and a backward leg, said legs being joined together by a curved horizontal portion open at its bottom and having a sprocket member adapted to support alternate vertical and horizontal chain links, a discharge hopper beneath said horizontal portion and adapted to receive commodities falling therefrom, a series of spaced disks of substantially the same shape and size as the interior of said pipe positioned in the latter, U-bolts extending toward each other from adjacent sides of said disks, the U-bolts on opposite sides of each of said disks being substantially at right angles, link members connecting the U-bolts on adjacent sides of said disks to form a continuous conveyer chain adapted to be received by said sprocket member, a bearing member composed of a spherical ball indented along one portion and fitted into said links and indented along an opposite portion and fitted into said U-bolts, and means for preventing retraction of said bearing members from said U-bolts.

2. In a conveying mechanism of the type described, a round conveyer pipe forming a forward leg provided with an inlet opening and a backward leg, said legs being joined together along vertical portions by a curved discharge hopper, a sprocket in said hopper adapted to receive alternate vertical and horizontal conveyer chain lengths, a series of bronze disks in said pipe, oppositely positioned U-bolts rigidly secured to the opposite sides of each disk, and chain members having an odd number of lengths connecting the U-bolts on adjacent sides of said disks and forming a conveyer chain extending through said pipe, said chain being twisted to provide relative rotation between said disks and said pipe.

3. In a conveying mechanism of the type described, a round conveyer pipe, a conveyer chain in said pipe, a series of adjacent disks centrally mounted on said chain, and means for moving said chain through said pipe, said chain being twisted and having relative rotation with respect to said pipe.

4. In a chain of the type described, spaced disk members having parallel U-bolts rigidly secured to adjacent sides thereof, a link member interlocked with said U-bolts, and a bearing member forming a connection between said U-bolts and said link member, said bearing member including a complementary grooved spherical body, the terminal end of said U-bolts being fitted into one groove and the terminal end of said link member fitted into another groove on said bearing member.

5. A bearing member for a chain, comprising a spheroid body having an arcuate groove along the side of its longer axis adapted to receive the terminal end of one link member and an arcuate groove along the side of its shorter axis adapted to receive the terminal end of another link member.

6. In a chain of the type described, a link member, a bearing member of spheroid shape having a groove along the side of its longer axis fitted about the terminal end of said link member and another groove on the side of the shorter axis positioned at right angles to said first named groove, and a second link member having its terminal portion fitted into said other groove.

7. A chain member as described in claim 6 including means on said second link member for maintaining the terminal end thereof adjacent the groove of said bearing member.

8. In a device of the type described, a round disk member, a centrally positioned U-bolt on one side of said disk, said bolt having legs extending through openings in said disk and being secured on the opposite side of the latter, an additional U-bolt on the opposite side of said disk at right angles to said first named U-bolt, said additional U-bolt having legs extending through said disk and secured on said one side thereof, link members interlocked with said U-bolts, bearing members separating the terminal portions of said link members and said U-bolts, and including a sphere-like body having oppositely positioned grooves, and means on said disks for maintaining the terminal portions of said U-bolts adjacent said bearing members.

WILLIAM L. DAVIS.